July 18, 1939.    L. MÜLLER    2,166,638
ARC WELDING APPARATUS WITH COATED ELECTRODES
Filed Oct. 27, 1937
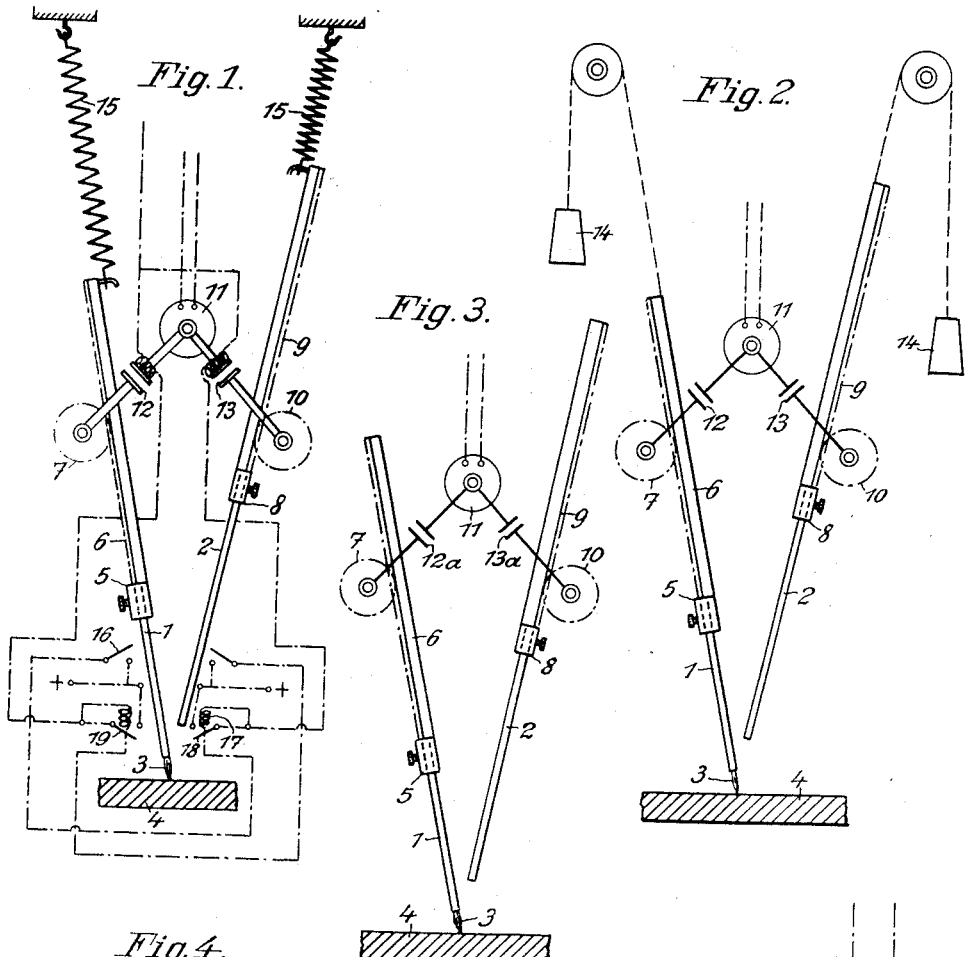
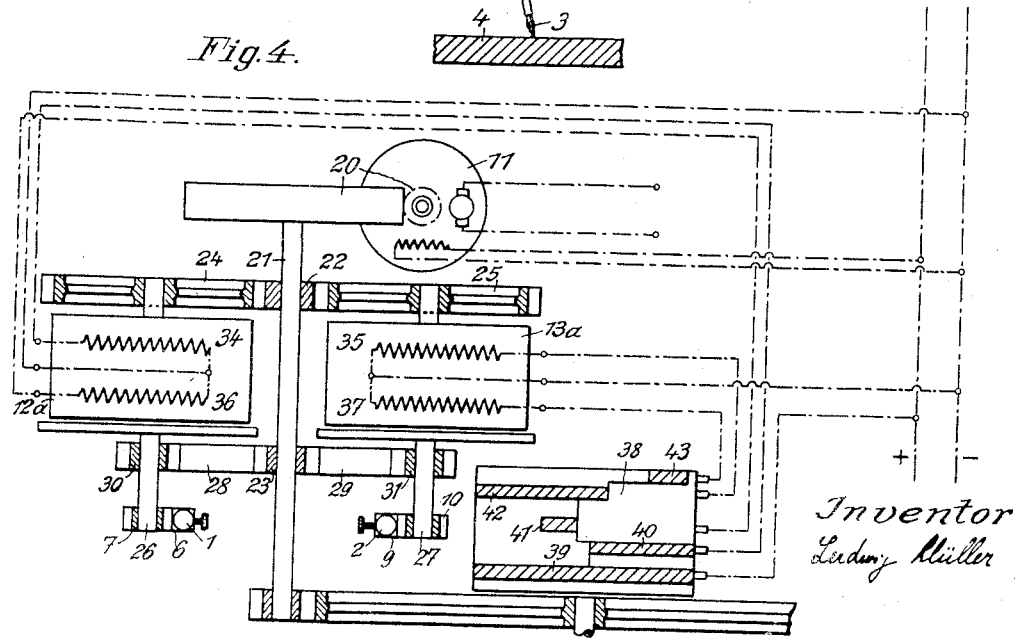
Inventor
Ludwig Müller Patented July 18, 1939

2,166,638

UNITED STATES PATENT OFFICE 2,166,638

ARC WELDING APPARATUS WITH COATED ELECTRODES

Ludwig Müller, Finsterwalde, Germany, assignor to the firm Kjellberg Elektroden & Maschinen G. m. b. H., Finsterwalde, Germany, a company of Germany Application October 27, 1937, Serial No. 171,185
In the Netherlands August 27, 1937

3 Claims. (Cl. 219—8)

Various constructions of arc welding apparatus with coated electrodes are known in which it is only possible to use electrodes manufactured for the particular purpose. These electrodes are expensive and make the welding apparatus complicated, so that welding cannot be carried out with them economically.

An arc welding apparatus has already been proposed having two coated electrodes which alternately move forwards and backwards automatically, and in which each of the two electrodes is moved forwards and backwards by means of a separate electro-motor and a separate gear with the help of rollers and cables. The two motors must alter their direction of rotation for the backward movement of the electrodes so that the motors must be designed comparatively large to provide for the necessary acceleration and braking. The control of the two motors is complicated in particular because a higher speed has to be employed for the return of the electrodes than for their forward feed. This known arrangement is therefore very complicated and of considerable weight and is not practically useful.

By means of the present invention an arc welding apparatus is provided with two coated electrodes which are alternately moved forwards and backwards automatically and the apparatus is simple in construction and light in weight so that the apparatus satisfies all practical requirements. The invention consists in providing for the two electrodes only a single electric-motor and in providing, between the motor and the holders for the electrodes, electro-magnetic couplings which are alternately coupled with the motor in order to advance the electrodes. The automatic withdrawal of the electrode which has been burnt up can be effected after the arc has been taken over by the new electrode, by suitable means, for example spring power or a counterweight. In consequence of the use of only one motor the apparatus is simple and easily supervised. The motor can be kept small as it always rotates in the same direction.

A particularly advantageous construction according to the invention has the electro-magnetic couplings in the form of reversing couplings which effect the withdrawal of the momentarily burnt up electrode by means of the single electric motor which effects the advance of the electrodes and always rotates in the same direction. There are thus no additional parts required for the withdrawal of the electrodes such as springs, counterweights and the like.

The automatic switching on and off of the electro-magnetic couplings may be effected by contacts which are closed or opened by the holding device according to its position. Especially when reversing couplings are used the opening and closing of the contacts is preferably effected according to the invention positively by means of a control drum or a control disc.

The invention is illustrated in detail by means of the accompanying drawing representing embodiments of the invention by way of example, the invention being, however, not limited to these particular embodiments. It is to be especially understood that the means and construction herein disclosed comprise the preferred form of several modes of putting the invention into effect, and that the invention is therefore claimed in any of its forms or modifications within the legitimate and valid scope of the appended claims.

Fig. 1 shows a diagrammatic representation of the complete welding apparatus according to the invention giving also the courses taken by the current, return springs being provided for moving the electrodes backward.

Fig. 2, while omitting the contacts and the courses taken by the current, shows the apparatus when counterweights are used for the return movement of the electrodes.

Fig. 3, while omitting the contacts and the courses taken by the current, shows the arrangement when electro-magnetic reversing couplings are employed.

Fig. 4 shows in diagrammatic representation the total arrangement of the apparatus according to Fig. 3 indicating the courses taken by the current.

For identical parts the identical reference marks have been used. In Fig. 1 is the melting electrode 1 in the moment in use and 2 is the electrode which at the moment is in the position of rest. 3 is the arc burning between the electrode 1 and the work 4. The electrode 1 is attached by its upper end in a holding device 5 which in the construction illustrated is mechanically advanced as the electrode is burnt away by means of a rack 6 and pinion 7. The electrode 2 also has a holding device 8 and a rack 9 and pinion 10. The operation of the pinions 7 and 10 is effected by means of an electro-motor 11 through the intermediary of two electro-magnetic couplings 12 and 13. At the upper end of each rack a return spring 15 is attached for the purpose of withdrawing the electrode holder after the melting away of the respective electrode, as soon as the connection between the motor and the gear is released by switching off the electro-magnetic coupling. For the purpose of switching the electro-magnetic couplings contacts 16 are provided which are arranged in such a manner that they can be immediately operated by the electrode holder passing by. Trip coils 17 serve to close the respective contacts 18, 19.

The mode of operation of the apparatus according to Fig. 1 is as follows:

In the illustrated position the electro-magnetic coupling 12 is excited, so that the electrode 1 is advanced in accordance with its melting away. When the electrode 1 is nearly melted away, the coupling 13 is put in circuit and the electrode 2 is advanced. At the moment when the ends of the two electrodes are close together the coupling 12 is cut out and the electrode 1 is withdrawn, the electrode 2 taking over the arc. In this way the arc is not quenched and it is therefore not necessary that the electrode 2 should touch the work in order to ignite the arc. The remainder of the electrode is removed from the holding device 5 and a new electrode is clamped in. When the electrode 2 is nearly burnt away, the coupling 12 is again put in circuit and shortly thereafter the coupling 13 is cut out and the electrode 2 is withdrawn and so on. In this manner an uninterrupted welding with ordinary commercial electrodes is made possible. The withdrawal of the holding device with the remainder of the electrode after the electrode has melted away is effected according to Fig. 1 by means of the return spring 15.

The switching operations of the various procedures are effected in the following manner:

Assume, that the left hand electro-magnetic coupling 12 is engaged and the left hand electrode 1 is moved toward the work 4 by means of the motor 11 during a welding operation. Then, at a predetermined moment, the electrode holder 5 engages the switch 16 and closes same, so that the electric circuit including the right hand electro-magnetic coupling 13 is closed and the latter is engaged, whereupon the motor 11 starts to advance the right hand electrode holder 8 supporting a new electrode 2 toward the work 4. Now, both electrodes 1 and 2 are advanced at the same time, until the new electrode 2 enters the arc 3 between the stub of the electrode 1 and the work 4. As soon as the arc 3 is taken over by the new electrode 2, the left hand electrode holder 5 opens the switch 19 during its further downward movement thereby interrupting the circuit including the left hand electro-magnetic coupling 12, so that the latter is disengaged and the spring 15 retracts the holder 5 into its upward limit position at a higher speed than the advancing speed of the electrode holders produced by the operation of the motor. In this upward limit position of the left hand electrode holder 5 the stub of the consumed electrode 1 may be removed and a new electrode may be inserted, while the right hand electrode 2 is advanced toward the work 4.

As the spring 15 retracts the left hand electrode holder 5, the latter opens the switch 16. In order to avoid an interruption of the circuit including the right hand electro-magnetic coupling 13 by this opening of the switch 16, a trip coil 17 is arranged in the circuit including said right hand electro-magnetic coupling 13. When the switch 16 is closed in the above described manner during the downward movement of the electrode holder 5, the trip coil 17 is excited and closes the switch 18, which connects the + pole of the electric source indicated on the right hand side of the device with the electro-magnetic coupling 13. Now, if during the upward movement of the left hand electrode holder 5 the switch 16 is opened, the excitation of the trip coil 17 disappears, but the circuit including the right hand electro-magnetic coupling 13 remains closed through the switch 18, as the latter being not biased by a spring or the like remains in its closing position. Therefore, the right hand electrode holder 8 continues to advance and operates the control switches on the right hand side of the apparatus in the same manner as described in connection with the cooperation of the left hand electrode holder 5 with the left hand control switches 16 and 19.

In Fig. 2 it is shown that, in place of the return springs 15, counterweights 14 may be provided which effect the backward movement of the electrodes. As for the rest the apparatus is exactly the same as that shown in Fig. 1.

The most advantageous embodiment of the arrangement according to the invention, is shown in Fig. 3 with the switching mechanism according to Fig. 4. The parts represented in Fig. 3 are the same as in Fig. 1, according to the identical reference marks, with the exception that in place of the electro-magnetic couplings 12 and 13 reversing couplings 12a and 13a are shown performing the advance and return movement of the electrodes so that no other means, as for instance springs, counterweights, or the like, are required for the return movement. With special reference to Fig. 4, the mode of operation of the mechanism with electro-magnetic reversing couplings is as follows:

The motor 11 whose field is separately excited and whose armature is fed immediately by the arc, operates the shaft 21 through the intermediary of a worm 20. On the shaft 21 there are fixed the pinion 22 for the advance movement and the pinion 23 for the return movement of the electrodes. The pinion 22 operates the cog wheels 24 and 25 sitting loosely on the shafts 26 and 27. The pinion 23 operates by way of two intermediate cog wheels 28 and 29, the cog wheels 30 and 31 which likewise sit loosely on the shafts 26 and 27. The electro-magnetic couplings 12a and 13a, each containing an upper coil 34 and 35 and a lower coil 36 and 37, are firmly attached to the shafts 26 and 27.

The operation of the whole mechanism is now effected in that manner that, during the advance of, for instance, the left electrode 1, the coil 34 is fed with current through the intermediary of the control drum 38 as well as the segments 39 and 40. Hereby the cog wheel 24 is magnetically coupled with the coupling 12a, whereby the pinion 7 advances the rack 6 and the electrode 1 with it. When the electrode has melted away the advance is checked in that way that the corresponding contact finger leaves the contact 40, while the contact segment 41 supplies the coil 36 with current through the intermediary of the corresponding contact finger. Hereby the coupling 12a is coupled with the cog wheel 30, so that the transmission of power is effected from the shaft 21, through the intermediary of the pinion 23 and the intermediate cog wheel 28, to the wheel 30 and, consequently, to the coupling 12a and the electrode 1. The procedure takes place in a corresponding manner for the right electrode 2 through the intermediary of the contacts 42 and 43.

What I claim is:

1. An automatic arc welding apparatus for continuous welding with a plurality of electrodes comprising: a pair of electrode holders adapted to be alternately moved toward and away from the work to be welded, a motor, a pair of coupling means, one of said coupling means being arranged between said motor and one of said electrode holders, the other coupling means being arranged between said motor and the other electrode holder, retracting means coupled with said electrode holders, and automatic control means for alternate engagement and disengagement of said coupling means, said motor being adapted to move said electrode holders toward the work at a predetermined advancing speed when the respective coupling means is engaged, and said retracting means being adapted to move the electrode holders away from the work at a higher speed than said advancing speed when the respective coupling means is disengaged.

2. An automatic arc welding apparatus for continuous welding with a plurality of electrodes comprising: a pair of electrode holders adapted to be alternately moved toward and away from the wodk to be welded, a motor, a pair of coupling means, each of said coupling means having advancing coupling elements and reversing coupling elements, gears for an increased retracting speed of the electrode holders, said gears being connected to said reversing coupling elements, one of said coupling means being arranged between said motor and one of said electrode holders, the other coupling means being arranged between said motor and the other electrode holder, and automatic control means for alternate engagement and disengagement of the advancing coupling elements and the reversing coupling elements respectively of said coupling means, said motor being adapted to advance said electrode holders toward the work at a predetermined advancing speed when the advancing elements of the respective coupling means are engaged with each other, and said motor being adapted to retract said electrode holders from the work at a higher speed than said advancing speed when the reversing elements of the respective coupling means are engaged with each other.

3. An automatic arc welding apparatus for continuous welding with a plurality of electrodes comprising: a pair of electrode holders adapted to be alternately moved toward and away from the work to be welded, a motor, a pair of electro-magnetic couplings, each of said electro-magnetic couplings having advancing coupling elements and reversing coupling elements, gears for an increased retracting speed of the electrode holders, said gears being connected to said reversing coupling elements, one of said electro-magnetic couplings being arranged between said motor and one of said electrode holders, the other electro-magnetic coupling being arranged between said motor and the other electrode holder, and a control drum provided with a plurality of control segments for alternate engagement and disengagement of the advancing coupling elements and the reversing coupling elements respectively of said electro-magnetic couplings, said control drum being operatively connected to said motor, said motor being adapted to advance said electrode holders toward the work at a predetermined advancing speed when the advancing elements of the respective electro-magnetic coupling are engaged with each other, said motor being adapted to retract said electrode holders from the work at a higher speed than said advancing speed when the reversing elements of the respective electro-magnetic coupling are engaged with each other, and said control segments having such a length and being arranged in such a manner on said control drum as to engage the advancing elements of one electro-magnetic coupling with each other at the end of the engaging period of the advancing elements of the other electro-magnetic coupling for an advancing movement of a new electrode while the arc between the stub of the other electrode and the work still exists and to disengage the advancing elements of said other electro-magnetic coupling after the taking over of the arc by the advancing new electrode.

LUDWIG MÜLLER.